United States Patent [19]

Saito et al.

[11] 4,401,971
[45] Aug. 30, 1983

[54] ALARM DEVICE FOR A VEHICLE INCLUDING PRIORITY CONTROL FOR PLURAL ALARM CONDITIONS

[75] Inventors: Tadashi Saito; Tohru Sampei; Akihiro Asada; Yoshihiro Ohta, all of Yokohama; Syunji Iwasaki, Gifu; Shigemitsu Higuchi, Yokohama; Hiroshi Ozawa, Katsuta; Yasunari Tanaka, Mito, all of Japan

[73] Assignee: Hitachi, Ltd., Tokyo, Japan

[21] Appl. No.: 242,187

[22] Filed: Mar. 10, 1981

[30] Foreign Application Priority Data

Mar. 10, 1980 [JP] Japan .............................. 55-30056
Mar. 28, 1980 [JP] Japan .............................. 55-38848

[51] Int. Cl.³ .................................................. G08B 19/00
[52] U.S. Cl. .................................. 340/52 F; 340/519; 340/692
[58] Field of Search .................... 340/52 F, 519, 692; 179/1 SM, 1 SG

[56] References Cited

U.S. PATENT DOCUMENTS

| | | | |
|---|---|---|---|
| 3,582,949 | 10/1968 | Forst | 340/519 |
| 3,870,818 | 3/1975 | Barton et al. | 340/692 |
| 3,879,704 | 4/1975 | Noji | 340/519 |
| 3,909,842 | 9/1975 | Noji | 340/692 |
| 4,296,409 | 10/1981 | Whitaker et al. | 340/52 F |

Primary Examiner—Glen R. Swann, III
Attorney, Agent, or Firm—Antonelli, Terry & Wands

[57] ABSTRACT

An alarm device for a vehicle comprises sensors for detecting abnormal states of the vehicle, a logic circuit for receiving the outputs of the sensors and producing one or more alarm speech designation signals and an alarm speech generator responsive to the alarm designation signal. The logic circuit includes a priority circuit for determining the order of precedence of the abnormal states represented by the detection signals on the basis of the degree of emergency, so that the alarm speech is concerned with the most emergent alarm when two or more abnormal states are detected simultaneously. The logic circuit may further include a switch circuit for disabling at least one of the detection signals so that a vehicle driver having taken notice of particular alarms is not disturbed by excessive alarming.

6 Claims, 11 Drawing Figures

FIG. 11

ALARM DEVICE FOR A VEHICLE INCLUDING PRIORITY CONTROL FOR PLURAL ALARM CONDITIONS

BACKGROUND OF THE INVENTION

The present invention relates in general to an alarm device for a vehicle such as a motor car, an electric car or a motor cycle. In particular, the invention concerns an alarm device for a motor vehicle which is intended for generating alarms upon occurrence of abnormalities or abnormal states of various equipments of the vehicle to thereby inform the occupants or passenger of the abnormalities.

Alarm devices for motor vehicles have heretofore been known and are widely employed with a view to assuring security of the occupants of the vehicle and/or protecting the occupants and the vehicle from accidents and failures to thereby secure safety in the operation of the motor vehicle. To this end, the alarm device is so constructed as to detect occurrence of abnormal states of equipments, parts and/or operating conditions to inform the occupant of them. More specifically, means for detecting occurrence of the abnormalities such as various types of sensors which respond to variations in physical quantities such as pressure, temperature, liquid temperature and so forth are provided at those locations where occurrence of abnormal states will possibly lead to serious accidents or failures. The output signals available from these sensors are evaluated and utilized to activate alarm lamps, buzzers or the like to inform the occupant(s) of the vehicle of the occurrence of the abnormal state or states. However, the hitherto known alarm devices suffer poor reliability in operation, that is, the occurrence of an abnormal state can not always be reported to the driver of the vehicle in a proper manner. For example, in the case of the motor vehicle, the driver has to keep his attention to the front, the rear and the sides of the motor car. Under the circumstance, it is difficult for the driver to pay constant attention to all the numerous alarm display lamps. Thus, an alarm may sometimes escape the driver's notice or be noticed too late. When buzzers are employed for generation of alarms, it is difficult to discriminate the kinds of alarms and hence the natures of the detected abnormal states in dependence on the tone of the sound generated by the buzzer. In practice, the buzzer is used only for producing a specific alarm.

As an attempt to overcome the shortcomings of the alarm lamp and buzzer described above, it may be conceived that the occurrence of an abnormal state is reported to the driver in the case of the motor vehicle through the medium of human speech. Needless to say, the function of the alarm device resides in checking the states or conditions of the equipments (such as the brake system and the like) which play an important role in securing the safe operation of the vehicle, equipments for assuring normal operation of the engine (such as engine oil pressure) and the equipment for assuring security of the occupant(s) (such as seat belts) and sending information on the result of the checks to the occupants without fail. In this connection, the alarm which resorts to the use of human speech and thus can appeal to the auditory sense of the driver is able to inform the driver of the occurrence of an abnormal state with an enhanced reliability. However, when two or more kinds of the alarm speeches are produced simultaneously, the driver will find it difficult to understand the produced alarms discriminatively, involving a problem in assuring safety, unlike the case where alarm lamps are used. For producing the alarm by making use of the human speech, there have hitherto been required audio reproducing apparatus such as magnetic tape and disc type playback apparatus which are however not only voluminous and expensive but also susceptible to malfunctions in adverse environmental conditions such as in a motor vehicle where large vibrations are generated and ambient conditions such as temperature and humidity undergo significant variations. For these reasons, the alarm device using the audio reproducing apparatus has not yet been practically used.

SUMMARY OF THE INVENTION

A primary object of the present invention is to provide an alarm device for a vehicle which is immune to the disadvantages of the hitherto known alarm devices described above and capable of informing occupants of the vehicle of occurrence of abnormal states which are to be urgently attended to, to thereby assure an increased security for the occupant.

According to an aspect of the invention, a speech synthesized through a PARCOR method or the like on the basis of speech characteristic parameters stored in semiconductor memory units is used for informing the occupant in a vehicle of an occurrence of an abnormal state of the vehicle. The alarm speeches are in the order of precedence determined on the basis of the degree of emergency of the abnormal states represented by the alarm speeches and are generated in the determined order. Thus, when two or more abnormal states take place, they are reported to the occupant in the order from the more to less serious abnormal states.

DESCRIPTION OF THE PREFERRED EMBODIMENTS

Figure 1:
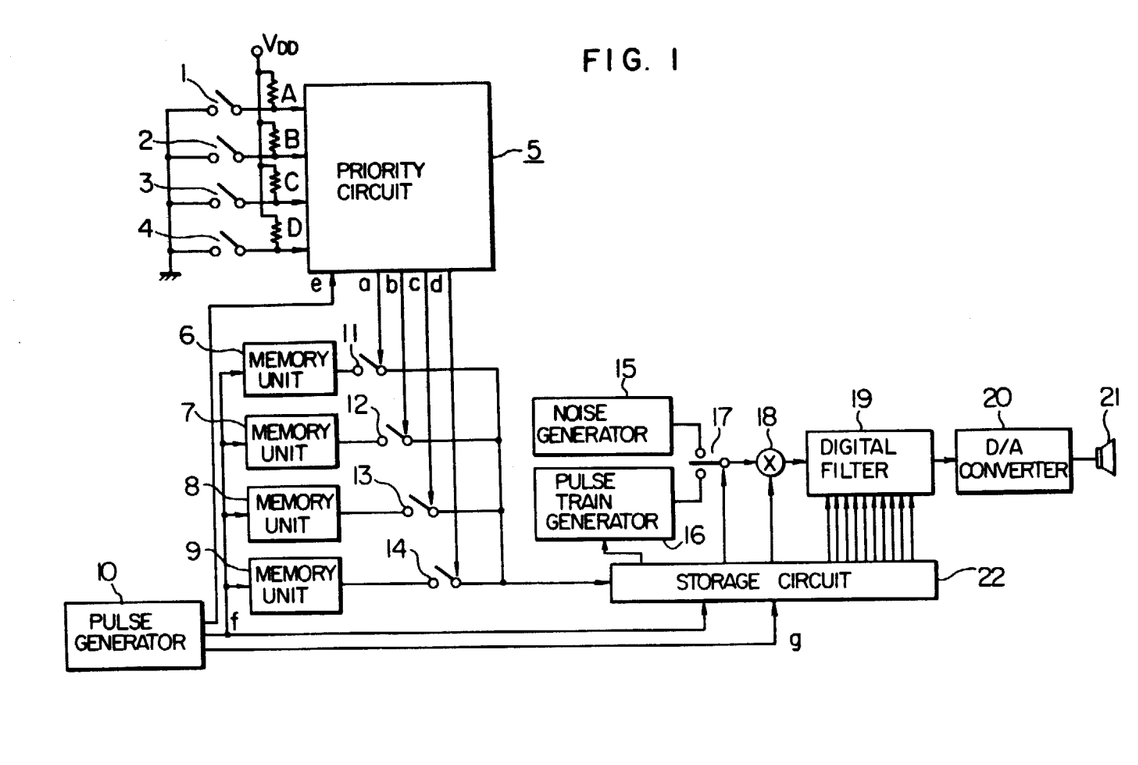
FIG. 1 shows in a block diagram an alarm device for a vehicle according to an embodiment of the invention.

FIG. 1 shows an exemplary embodiment of the alarm device according to the invention in which the PARCOR (acronym for *partial autocorrelation*) method is adopted for generating alarm speeches. Since the PARCOR method per se is well known in the field of speech analysis technology, detailed description thereof will be unnecessary. Briefly reviewed, according to the PARCOR analysis for extracting speech characteristic parameters which are characteristic of speech, an original speech signal is divided into sections or intervals of a duration in a range from 10 msec to 20 msec. For each of the speech sections thus divided, a partial autocorrelation coefficient (hereinafter referred to as a PARCOR coefficient) which is a kind of linear prediction coefficient characterizing the speech is arithmetically determined. At the same time, signals representing the sound level (volume) and the pitch and a discrimination signal for identifying whether a sound is a vocal sound (vowel) or voiceless sound (consonant) are produced and stored. For synthesizing the speech according to the PARCOR synthesization process, the sound level (volume) signal, pitch signal and the discrimination signal and the PARCOR coefficients determined on a time-series base through the PARCOR analysis are retrieved.

Referring to FIG. 1, there are provided memory units 6, 7, 8 and 9 for storing therein the speech characteristic parameters which include the sound levels (volumes), pitches and the discrimination signals for identifying whether a sound is a vocal sound or a voiceless sound and the PARCOR coefficients as obtained through the PARCOR analysis. In the case of the illustrated embodiment of the invention, the original speech is separated into intervals each of 20 msec for the PARCOR analysis, so that the speech characteristic parameters are recorded in data quantity of 48 bits for every interval on the time-series base.

Data required for producing a single alarm speech is 4.5 K bits long which corresponds to a time duration of two seconds. These data constitute alarm data. The synthesis of a speech based on the PARCOR method is purely electronically realized with the aid of a noise generator 15, a pulse train generator 16, an electronic change-over switch 17 for selectively conducting the vocal signal and the voiceless sound signal, a multiplier 18, a digital filter 19, a D/A converter 20 and a storage circuit 22. At present, these circuit components are commercially available in a single large scale integrated circuit device, such as the speech synthesizer LSI HD 38880 manufactured by Hitachi, Ltd. First, use is made of the discrimination signal so that when a sound to be reproduced is a voiceless sound the noise generator 15 is selected as a sound source corresponding to the human vocal chords while when a sound to be reproduced is a vocal sound the pulse train generator 16 is selected and at the same time the repetition frequency of the pulse train is determined on the basis of data or information concerning the pitch of the sound in concern. The sound source signal thus produced is then fed to the multiplier 18 to be multiplied with data of the sound level. The resultant signal is subsequently supplied to the digital filter 19. In the case of human vocalization or utterance, compression waves produced by vibration of the vocal chords are produced by varying the structural configuration of the vocal tract to thereby produce desired tones. In contrast, according to the PARCOR synthesis, tone is created in the digital filter on the basis of the PARCOR coefficients determined through the PARCOR analysis. The signal thus synthesized for reproduction is converted to a corresponding analog signal by the D/A converter and produced as a voice through a loud speaker 21. The storage circuit 22 stores therein information or data of 48 bits, i.e. data of the sound level, pitch, discrimination information for identifying the vocal and voiceless sounds and the PARCOR coefficients which are required for synthesizing speech having an interval of 20 msec. The data of 4.8 K bits stored in the memory elements 6, 7, 8 and 9 are sequentially fed to the storage circuit 22 every 20 msec, whereby a speech of two seconds in length or duration is reconstituted.

Figure 2:
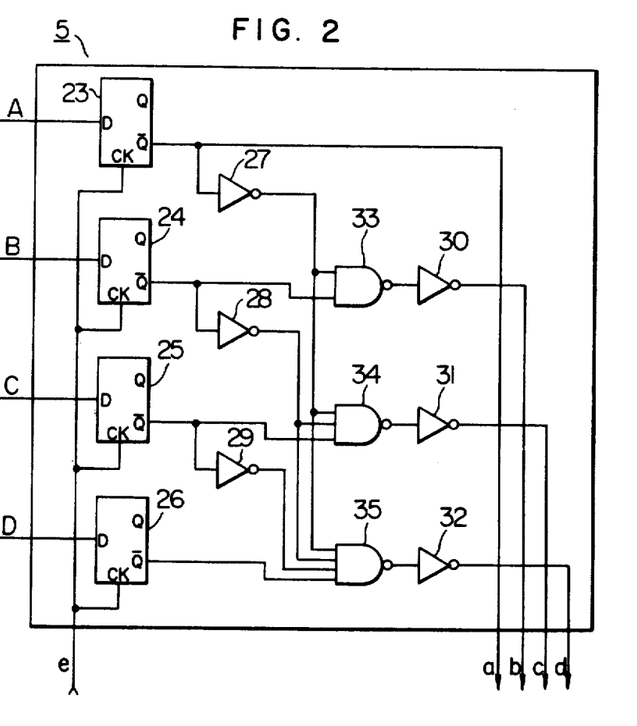
FIG. 2 is a circuit diagram showing an example of a priority circuit which may be employed in the alarm device according to the invention.

In FIG. 1, detector switches 1 to 4 constitute sensors for detecting abnormal states, provided at various parts of a vehicle such as a motor car for assuring safety in the operation thereof. More specifically, the detector switch 1 is turned on, when brake oil is insufficient. The detector switch 2 is mounted in combination with a door so that the switch 2 is turned on unless the door is perfectly closed. The detector switch 3 is turned on when a hand brake is pulled up. The detector switch 4 is closed, unless a seat belt is employed. These detecting switches 1, 2, 3 and 4 produce, upon actuation, abnormal state detection signals A, B, C and D, respectively, which vary from a high potential level to a low potential level. To this end, these switches are connected to a voltage supply source $V_{DD}$ through respective resistors. A priority circuit 5 which may be referred to also as a sequencer circuit serves to determine the order of the abnormal state detection signals supplied from the detector switches 1 to 4. FIG. 2 shows an exemplary circuit arrangement of the priority circuit 5 in some detail. In this drawing, reference numerals 23, 24, 25 and 26 denote D-type flip-flops which receive the abnormal state detection signals A, B, C and D, respectively. The $\overline{Q}$-output terminals of the D-type flip-flops 23, 24 and 25 are connected to the inputs of inverters 27, 28 and 29, respectively. The output terminal of the inverter 27 is connected to one of the input terminals of each of the NAND gates 33, 34 and 35, the output terminal of the inverter 28 is connected to another one of the input terminals of each of the NAND gates 34 and 35, and the output terminal of the inverter 29 is connected to another input terminal of the NAND gate 35. The $\overline{Q}$-outputs of the D-type flip-flops 23, 24, 25 and 26 are directly supplied to an output terminal a of the priority circuit 5 and to the other input terminals of the NAND gates 33, 34 and 35, respectively. Accordingly, the NAND gate 33 has two input terminals, the NAND gate 34 has three input terminals and the NAND gate 35 has four input terminals. The outputs of these NAND gates 33, 34 and 35 are supplied, respectively, to associated inverters 30, 31 and 32 whose outputs are applied to the output terminals b, c and d. Since the priority circuit of this kind is known in the art, detailed description is omitted here. Referring now back to FIG. 1, when only the detection signal A assumes a low (ground)potential, a signal "a" is produced from the output terminal a of the priority circuit 5 as an alarm speech designation signal. In a similar manner, when only the signal B, C or D assumes the ground potential, signals "b", "c" or "d" are produced from the associated output terminal as the alarm speech designation signal "b", "c" or "d". In the case where two or more detection signals are supplied as the inputs to the priority circuit 5, the precedence is assigned to the input detection signals in the order of A, B, C and D.

Figure 3:
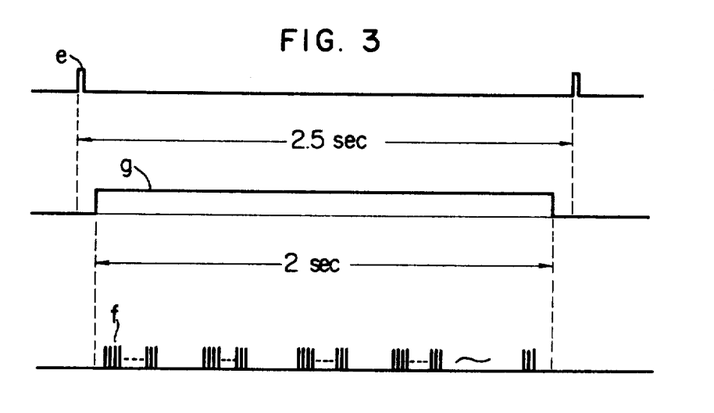
FIG. 3 shows signal waveform diagrams to illustrate the operation of the alarm device shown in FIG. 1.

A pulse generator 10 produces clock signals for the whole alarm device, whereby various constitutent circuits are operated on the basis of the clock signals. More particularly, when an ignition key switch of the motor vehicle is closed and a transmission gear is in any one of the active positions other than the neutral position, the pulse generator 10 is put into operation, to thereby produce a signal fetch pulse e at a periodic interval of 2.5 seconds, which pulse e is supplied to the priority circuit 5, a speech synthesization command signal g which is supplied to the storage circuit 22 and a transfer clock pulse signal f for transferring the speech analysis data of 48 bits which constitutes the alarm data to the storage circuit 22 from the memory elements 6 to 9. The phase relationship among these clock signals e, g and f is illustrated in FIG. 3.

The change-over switches 11, 12, 13 and 14 constitute switch means driven by the alarm speech designation signal "a", "b", "c" or "d" produced from the priority circuit 5 and serve to allow the alarm data to be read out selectively from the memory units 6, 7, 8 or 9. The alarm data obtained from the memory elements 6 to 9 through the above-mentioned switch means are supplied to the storage circuit 22 together with the speech synthesization command signal g and the data transfer clock pulse signal f.

Thus, the priority circuit 5 is a major constituent of a logic circuit destined for producing the alarm speech designating signal or signals in response to the abnormal state detection signal A, B, C and/or D. The memory elements 6, 7, 8 and 9 constitute a memory array provided in correspondence to the detecting switches 1 to 4. This memory array, the storage circuit 22 supplied with the alarm data, the noise generator 15, the pulse train generator 16, the switch 17, the multiplier 18, the digital filter 19 and the D/A converter 20 are constituents of alarm speech producing means.

In the following, operation of the alarm device will be described. Assuming that when the ignition key switch is closed by a driver and the engine is started with the transmission gear being set to one of the active gear positions other than the neutral position, the quantity of brake oil is insufficient, for example, then the detector switch 1 is turned on, which results in the signal a assuming a potential level corresponding to the source level, whereby the alarm data stored in the memory unit 6 is transferred through the change-over switch 11 to the storage circuit 22 to be synthesized into a speech or vocal alarm BRAKE OIL IS INSUFFICIENT which is produced from the loud speaker 21 as a vocal alarm to the driver. In a quite similar manner, when a door is not satisfactorily closed, synthesization of the corresponding alarm speech data stored in the memory unit 7 is brought about by the detection switch 2 through the change-over switch 12, whereby a speech or vocal alarm DOOR REMAINS OPEN is transmitted to the driver. When the hand brake remains in the pulled state, then the speech alarm data stored in the memory element 8 is synthesized in quite the same manner, whereby a speech or vocal alarm RELEASE HAND BRAKE is produced. In the case where the seat belt is not put on, the corresponding alarm data stored in the memory element 9 is synthesized in quite the same manner into a speech or vocal alarm FASTEN SEAT BELT, for example. When two or more alarms are to be produced, then precedence is allotted to the productions of the alarm speeches in accordance with the designated priority. For example, the highest precedence or priority may be imparted to the alarm concerning the level of brake oil having the highest degree of emergency. The next highest precedence is allotted to the alarm concerning the state of the door, which is followed by the precedence of the alarm concerning the state of the hand brake over the alarm concerning the conditions of the seat belt. The alarm device is of course in operation constantly even when the motor vehicle is running.

Figure 4:
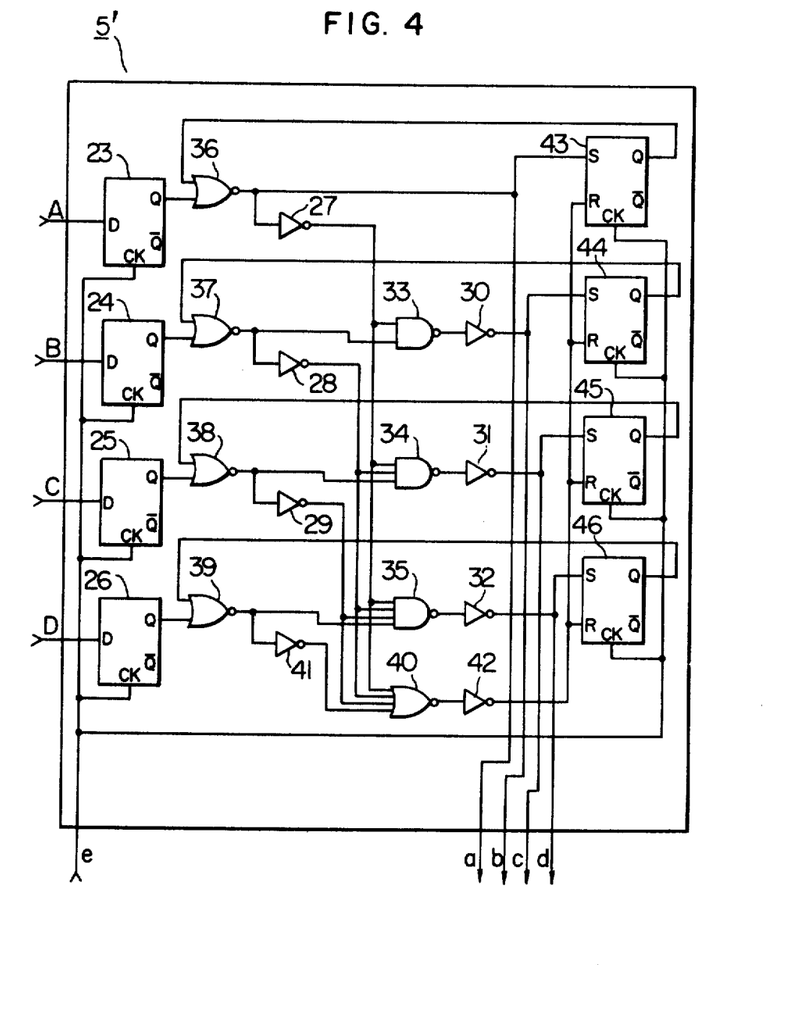
FIG. 4 shows in a circuit diagram another example of the priority circuit which may be employed in the alarm device according to the invention.

FIG. 4 shows in a circuit diagram another exemplary embodiment of the invention. In this figure, only the priority circuit 5' is shown with other circuit portions being omitted from illustration, since they are implemented in the same manner as the embodiment shown in FIG. 1. In the case of the embodiment shown in FIG. 4, there are provided RS-type flip-flops 43 to 46 in addition to the D-type flip flops 23 to 26 serving for fetching the signals A to D. The RS-type flip-flops 43 to 46 serve to "memorize" generation of the speech alarms. The outputs of these flip-flops 43 to 46 serve, in combination with the outputs of NOR gates 36 to 39 to temporarily disable the detection signal outputs from the D-type flip-flops 23 to 26. Exept for these connections, the arrangement of the priority circuit 5' is substantially the same as the one shown in FIG. 2.

More specifically, referring to FIG. 4, the inverters 27 to 29, the output terminal a of the priority circuit 5' and the NAND gates 33 to 35 receive outputs from the NOR gates 36 to 38, respectively, which gates have, respectively, first input terminals supplied with Q-outputs from the D-type flip-flops 23 to 26. In this embodiment, the $\overline{Q}$-outputs from the D-type flip-flops 23 to 26 are not used. The output of the NOR gate 36 having a second input supplied with the Q-output from the RS-type flip-flop 43 is supplied also to a set terminal of the RS-type flip-flop 43. The outputs from the inverters 30 to 32 are supplied also to the set terminals of the RS-type flip-flops 44 to 46, respectively, the Q-outputs from which are supplied to second input terminals of the NOR gates 37 to 39, respectively. The NOR gate 40 has four input terminals for receiving, respectively, the outputs from the inverters 27 to 29 and the inverted output from the NOR gate 39 through an inverter 41. The output from the NOR gate 40 is applied to reset terminals of the RS-type flip-flops 43 to 46, respectively through an inverter 42. The signal fetch pulse e shown in FIG. 3 is applied to the clock terminals of the D-type flip-flops 23 to 26 and the RS-type flip-flops 43 to 46. The remaining circuit portions are realized in the same circuit configuration as the one shown in FIG. 2.

With the structure described above, when two or more abnormal state detection signals occur simultaneously, the speech alarm designation signals are produced sequentially in the order of the priority determined for the associated detection signals. When the alarm speech designation signal produced as the output signal of the priority circuit 5' is terminated, the RS-type flip-flop 43 to 46 are reset to the initial state ready for producing again sequentially the alarm speech designation signals in the determined order of precedence for the associated detection signals after each elapse of 2.5 seconds.

In the case of the exemplary embodiments described so far, the speech synthesization according to the PAR-COR method is adopted. However, it should be appreciated that the invention can be equally realized by using vocoder systems and terminal analog systems which can be implemented purely in the form of semiconductor devices. Needless to say, the content of the alarms is not restricted to the four varieties described above but can be increased or decreased in substance, as occasion demands. Further, the logic circuit including the priority circuit for determining the order of precedence for the abnormal state detection signals may be realized by using a microcomputer such as "Type HCMS 43" available from Hitachi, Ltd. in Japan, for example. In this case, the alarm detection signals A to D are checked as to the presence thereof sequentially in the order of the emergency or urgency of the abnormal states represented by these alarm signals in accordance with a program illustrated in a flow chart shown in FIG. 11.

Figure 11:
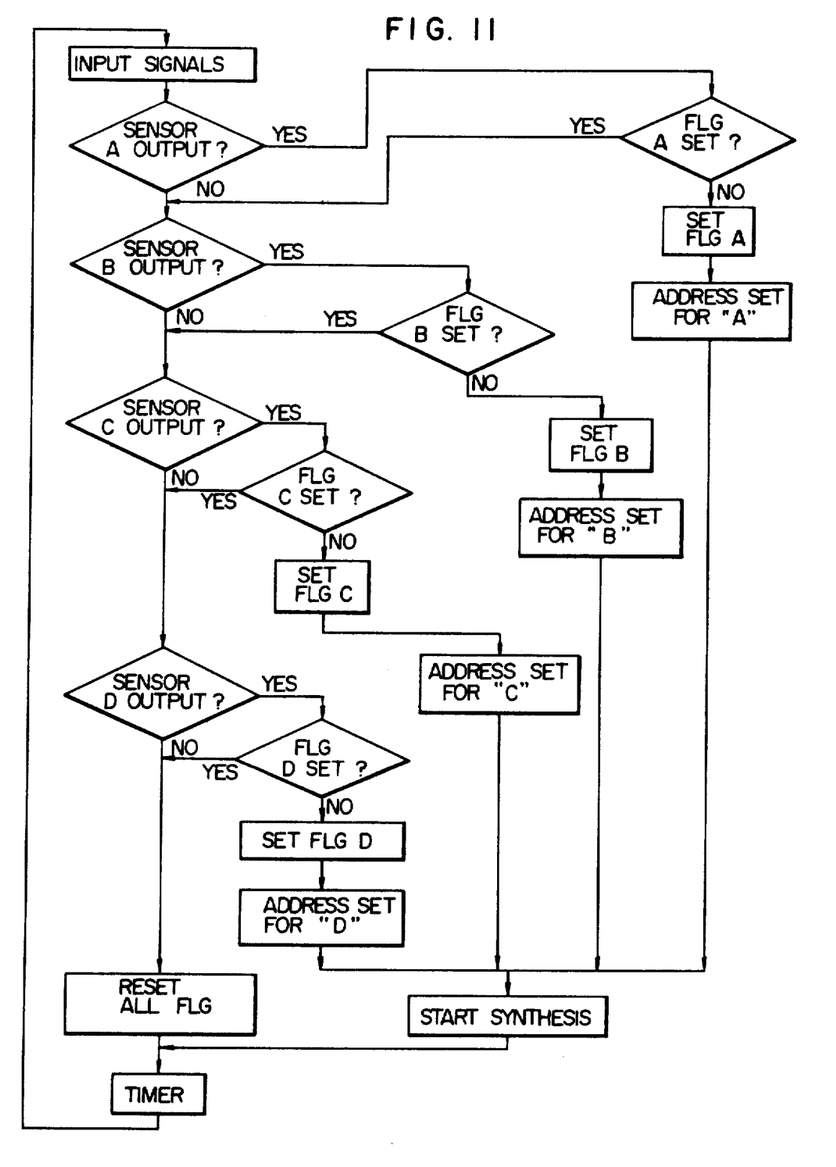
FIG. 11 is a flow chart to illustrate a series of procedures to be executed when the invention is carried out with the aid of a microcomputer.

Referring now to FIG. 11, which is applicable to the embodiments shown in FIG. 1 or 4, the outputs A, B, C and D of the sensors of detection switches 1-4 are first inputted. In case the detection output signal A is appearing, it is inspected whether flag A has been set indicating a delivery of comments for signal A. If flag A has been set the next step is to be performed, while if not flag A will be set and an address will be set to the memory array (ROMs) where the comments for the signal A are stored to start an alarm speech synthesis.

In case the detection signal A is not present, the next step is to be performed, in which a procedure similar to that mentioned above with respect to signal A is executed with respect to signal B. The same is true of signals C and D. Then, if signal D is no longer present, or if flag D has already been set, all the flags will be reset. After a time interval of an alarm speech synthesis, the first step is reverted to.

It should be understood that in FIG. 11 and the above description of the steps for inspection, set and reset may be disregarded insofar as an exact correspondence with the FIG. 1 or FIG. 2 embodiment is concerned.

The speech alarm system capable of producing a vocal alarm which carries a direct and straight-forward indication of the abnormal states is excellent in respect of certainty over the visual alarm system such as an alarm lamp. However, there may arise a problem in the speech alarm system in conjunction with the language to be used. More specifically, in the case of the visual alarm display using letters or characters, the contents or message of an alarm may be displayed in a plurality of different languages, which is advantageous in the case where a number of passengers whose understandable languages are different are in the same vehicle or where vehicles are to be exported to regions or countries in which different languages are used. Of course, a speech alarm may be produced in a plurality of different languages, which however means a great deal of redundancy for the driver or passengers who can understand only a specific language.

In another embodiment of the invention, the speech alarm data is stored in the alarm device in a plurality of different languages, wherein selection of a language with which the speech alarm is to be produced is effected by means of an externally manipulatable switch.

Figure 5:
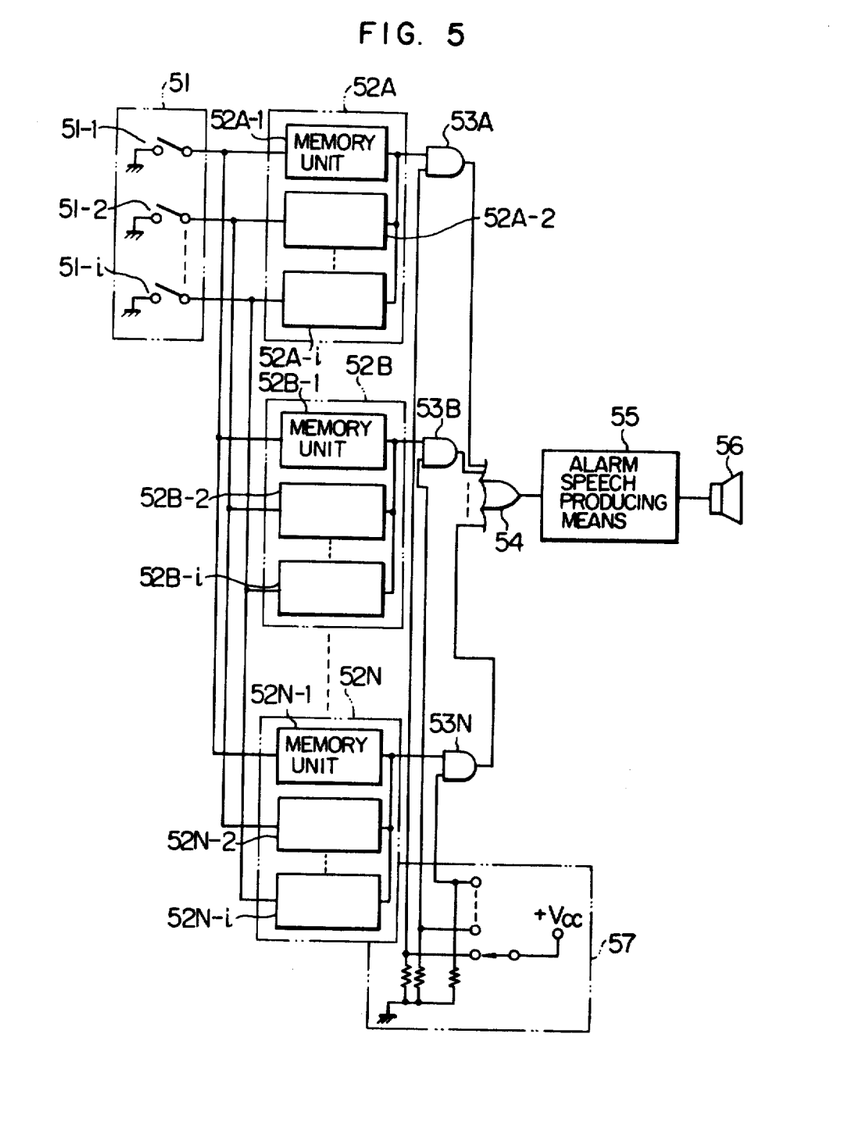
FIG. 5 shows in a block diagram another embodiment of the alarm device for a vehicle according to the invention.

FIG. 5 shows a further embodiment of the invention which is so constructed as to allow a speech alarm to be produced in a language selected from a group of previously stored different languages. Referring to the drawing, reference numeral 51 denotes a detecting apparatus including a plurality of detector switches (or sensors) 51-1 to 51-i for detecting respective abnormal states. Reference characters 52A to 52N denote memory blocks for storing in given languages the alarm data for i kinds or varieties (i is an interger) of speech alarms. The memory blocks 52A to 52N constitute a memory array as a whole. The output signals derived from the individual detector switches 51-1 to 51-i are supplied to corresponding memory units 52A-1, 52B-1, ..., 52N-1, 52A-2, 52B-2, ..., 52N-2, ..., and 52A-i, 52B-i, ..., 52N-i of the memory blocks 52A to 52N. The outputs of the memory units in each of the memory blocks 52A to 52N are supplied in common to the first input terminals of individual AND gates 53A to 53N. Reference numeral 57 denotes a language selector switch device which may include, for example, N (N is an integer) resistors having first ends connected to the ground and second ends connected to the second input terminals of the AND gates 53A to 53N, respectively, and switch elements for selectively applying a potential from a potential source $+V_{CC}$ to the other ends of the resistors. The outputs from the AND gates 53A to 53N are supplied to respective inputs of an OR gate 54. The alarm data corresponding to the output of the OR gate 54, that is, the alarm data for a selected language is supplied to the alarm speech producing means 55. For the convenience of illustration, the memory array (memory blocks 52A to 52N) constituting a part of the alarm speech producing means 55 is shown outside the corresponding block. The output from the alarm speech producing means 55 is applied to a loud speaker 56 for generation of the alarm speech.

Next, operations of the alarm device shown in FIG. 5 will be described. The sensors 51-1, 51-2, ..., 51-i provided in the detecting apparatus 51 are installed at various locations in a motor vehicle and serve to convert variations in physical quantities such as pressure, temperature, liquid flow and so forth into corresponding electric signals which take the ground potentials upon occurrence of abnormal states in the monitored quantities. In dependence on the ground potential output from the sensor, the corresponding memory elements are selected. For example, assuming that the sensor 51-1 of the detector unit 51 detects an abnormal state, the memory units 52A-1, 52B-1, ..., 52N-1 of the memory blocks 52A, 52B, ..., 52N are selected. Among the plurality of the thus selected memory units, the data stored in memory unit specified through the AND gates 53A, 53B, ..., 53N in cooperation with the selector switch unit 57 for selecting one of these AND gates and the OR gate 54 are transferred to the alarm speech producing means 55, whereby the alarm speech is produced through the loud speaker 56 on the basis of the alarm data stored in the selected memory unit. In the individual memory units 52A-1, 52A-2, ..., 52A-i of the memory block 52A, there may be stored the alarm data for the kinds of alarm speeches to be produced in Japanese in response to the abnormal states detected by the various sensors described above, while the alarm data for the alarm speeches to be produced in English may be stored in the units 52B-1, 52B-2, ..., 52B-i of the memory block 52B. In a similar manner, the alarm data for the alarm speeches to be produced in other languages may be stored in the memory blocks 52C to 52N. Under the conditions, when the AND gate 53A is selected by the selector switch unit 57, then the alarm speech or speeches are produced in Japanese in dependence on the output signals produced from the abnormal state detecting sensors 51-1, 51-2, ..., 51-i of the detector unit 51. For the same reason, when the AND gate 53B is selected by the selector switch device 57, the alarm speech corresponding to the abnormal state detected by the sensor of the abnormal state detecting unit 51 is produced in English. In this way, the alarm speech can be produced in any one of N different languages through selection by means of the selector switch device 57.

In the case of the above-mentioned embodiment, the priority circuit 5 shown in FIG. 1 may be interposed between the detector apparatus 51 and the memory blocks 52A to 52N, while an array of the change-over switches 11 to 14 shown in FIG. 1 may be inserted between the output terminals of the memory units of each memory blocks 52A-1, ..., 52A-i, ..., 52N-1, ..., 52N-i, and the corresponding AND gates 53A to 53N whereby the alarm speech may be produced in a desired language in the order of the emergency of the detected abnormal states, as described hereinbefore in conjunction with FIGS. 1 to 4.

As is appreciated from the foregoing description, the invention has provided an alarm device for a vehicle which is capable of informing the driver of the occurrence of abnormal states in the form of straightforward speech information without fail, thereby to assure safety for the driver and the passengers and/or protect the vehicle from possible failures and damages. Further, since the alarm speech is produced by purely electronic means without resorting to the use of any movable parts, an adequately high reliability in operation can be attained even in adverse environmental conditions such as in the motor vehicle which is subjected to vibrations, unfavorable temperatures and/or moistures. By providing the precedence or priority order to the generation of the speech alarms in dependence on the degree of urgency of the detected abnormal states, remarkably enhanced security and safety can be attained. Besides, the speech alarm can be produced in a selected one of many different languages from one and the same alarm device through simple manipulation of a selector switch, which is very advantageous in such application where a plurality of persons or passengers capable of understanding native languages only, for example, are carried. On the other hand, the vehicle manufacturers can export their products each provided with a single alarm device to various countries or regions without encountering any difficulty in making the speech alarm device compatible with various different languages.

In the case of the exemplary embodiment described so far, the speech alarm continues to be produced until the associated abnormal state has been removed. However, there are such kinds of alarms which do not concern directly the running conditions of the vehicle and which would give discomfort to the passengers if they continue to be generated. In such a case, if the whole alarm device is turned off, the object to assure a high security to the passengers can not be attained.

Accordingly, in another embodiment of the invention, a second logic circuit including means such as a switch, for example, for ceasing or interrupting the alarm speech is provided, wherein an alarm speech once produced in response to a detected abnormal state is interrupted manually or automatically by means of the above-mentioned switch without providing any obstacles for production of the other speech alarms.

Figure 6:
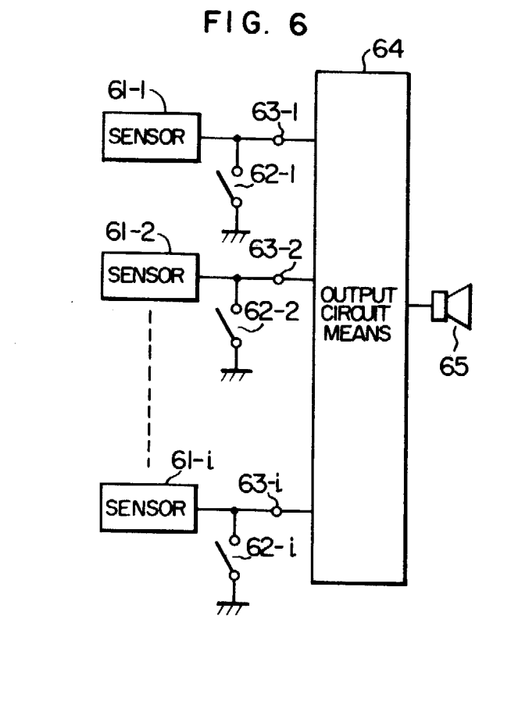
FIGS. 6 to 9 are block diagrams to show the alarm devices for a vehicle according to further embodiments of the invention.

Referring to FIG. 6, reference characters 61-1 to 61-i denote sensors for detecting various abnormal states. These sensors have switches 62-1 to 62-i connected to the output terminals thereof, respectively, which switches 62-1 to 62-i serve to disable the detection signals from the associated sensors. Numeral 64 denotes output circuit means including the alarm speech producing means or a combination of the logic circuit and the alarm speech producing means. The output circuit means 64 has input terminals 63-1 to 63-i to which the switches 62-1 to 62-i are connected, respectively, and an output terminal connected to the loud speaker 65. The switches 62-1 to 62-i constitute a second logic circuit. The abnormal state detection sensors serve to detect abnormal states such as of engine oil pressure, brake oil, cooling water, air-pressure in pneumatic tires, the speed, the fan drive belt, the generator, the seat belt and the like. In operation, when an abnormal state is detected by the k-t' sensor (where $1 \leq k \leq i$), the abnormal state detection signal is applied to the input terminal 63-k of the output circuit means 64, whereby the output circuit means 64 produces an alarm speech such as FASTEN SEAT BELT or BRAKE OIL IS INSUFFICIENT, for example, in response to the k-th abnormal detection signal. When an action to remove the detected abnormal state is taken (e.g. the seat belt is put on), the abnormal state detection signal will disappear from the sensor 61-k, which results in the corresponding alarm speech being automatically stopped. However, when such action can not or need not be immediately taken, then the switch 62-k is closed to thereby prevent the abnormal detection signal from being transmitted to the output circuit means 64 from the alarm sensor 61-k. The result is that the repeated generation of the alarm speech in response to the abnormal state detection output from the k-th sensor is forcibly stopped. Since a switch is provided for every sensor, an alarm speech can be generated in response to another abnormal state detection signal output from another sensor, even when the switch for the sensor 61-k is closed. Of course, the switch 62 for stopping the generation of the alarm speech may be omitted for the sensors which are adapted to detect the more dangerous abnormal states such as the over-speed, insufficiency of the brake oil or the like.

Figure 7:
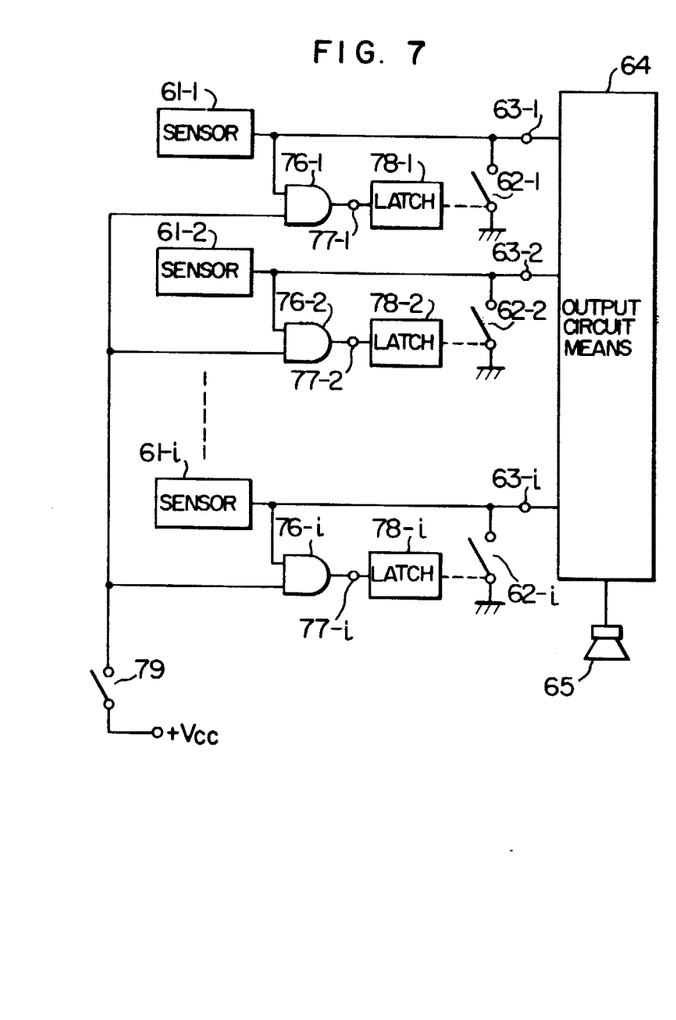

FIG. 7 shows still another embodiment of the invention. In the figure, mutual connections among the sensors 61-1 to 62-i, the switches 61-1 to 62-i, the output circuit means 64 and the speaker 65 are the same as those shown in FIG. 6. However, in the case of the embodiment shown in FIG. 7, series connections of each of the AND gates 76-1 to 76-i and each of the latch circuits 78-1 to 78-i are interposed between the sensors 61-1 to 61-i and the switches 62-1 to 62-i, respectively, so that the output signals from the sensors 61-1 to 61-i are applied to first input terminals of the associated AND gates 76-1 to 76-i, respectively, while the output signals from the AND gates 76-1 to 76-i are supplied to the associated latch circuits 78-1 to 78-i, respectively. Thus, the switches 62-1 to 62-i are driven by the associated latch circuit 78-1 to 78-i. The second input terminals of the AND gates 76-1 to 76-i are connected mutually and to the output terminal of a switch 79 which serves, when closed, to produce a disable signal to the inputs of the AND gates 76-1 to 76-i, respectively. When the switch 73 is opened, the second input terminals of the AND gates 76-1 to 76-i are at a low potential level. Reference symbols 77-1 to 77-i denote the set terminals of the latch circuits 78-1 to 78-i, respectively. In the case of the exemplary embodiment now being described, the switches 62-1 to 62-i, the switch 79, the AND gates 76-1 to 76-i and the latch circuits 78-1 to 78-i constitute the second logic circuit.

Assuming now that the k-th ($1 \leq k \leq i$) alarm sensor detects an abnormal state, a corresponding alarm speech is produced in the same manner as described hereinbefore in conjunction with FIG. 6. In the case of the preceding embodiment shown in FIG. 6, the removal of the alarm speech is effected by actuating the switch 62-k. However, in the case of the embodiment shown in FIG. 7, the switch 79 is actuated to the same effect. In other words, the abnormal state detection signal produced from the sensor 61-k and the signal produced by the switch 79 are ANDed to thereby set the latch circuit 78-k, which results in that the switch 62-k is operated to stop the generation of the alarm speech. The same applies to the detection of other abnormal states by the other sensors. It will be appreciated that the single switch 79 is effective for stopping the generation of the various alarm speeches.

Figure 8:
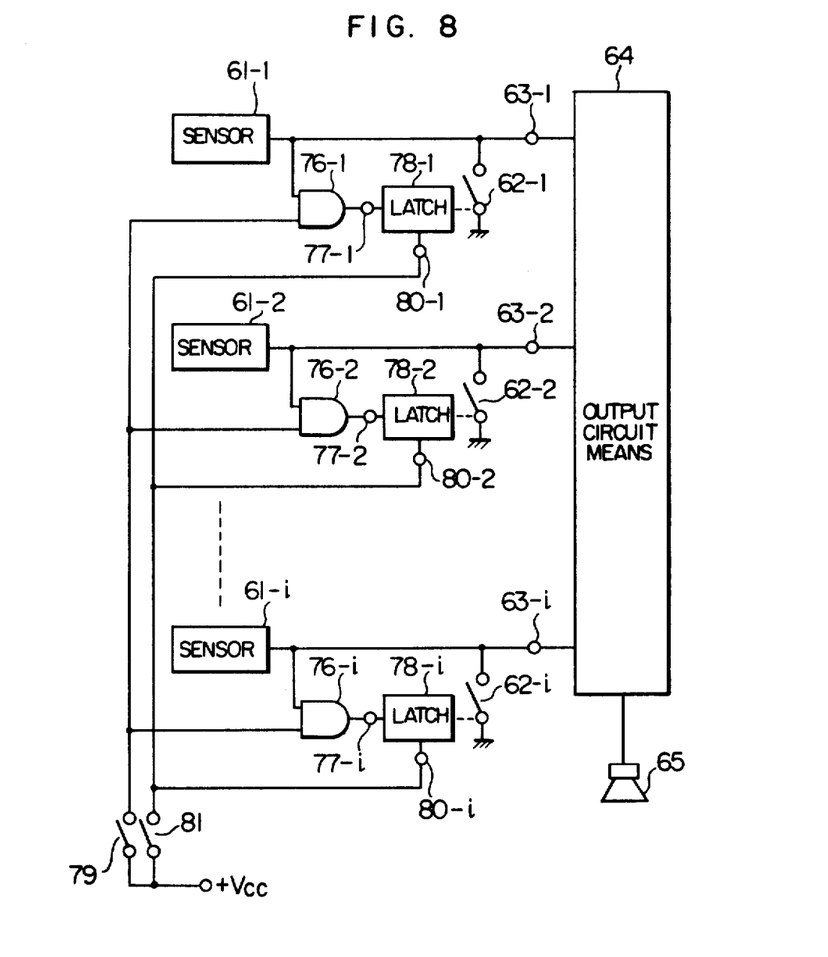

In the case of the embodiments described above in conjunction with FIGS. 6 and 7, generation of the alarm speech can be arbitrarily stopped at the will of the operator or driver. In this connection, there may happen such a case in which no measures or actions are taken to remove the abnormal state or states in response to the alarm speech and only the generation of the alarm speech is stopped with the abnormal state being left forgotten. FIG. 8 shows another embodiment of the invention which is intended to dispose of such an undesirable situation.

Referring to FIG. 8, latch circuits 78-1 to 78-i are provided additionally with reset terminals 80-1 to 80-i, respectively, and a switch 81 is provided to supply a reset signal in common to these reset terminals. Except for this arrangement, the remaining circuit configuration is the same as the one shown in FIG. 7. Accordingly, further description of the circuit construction will be unnecessary. According to the embodiment shown in FIG. 8, the latch circuit which has been set for stopping generation of an alarm speech can be reset through operation of the switch 81, whereby the switch (62-1, . . . , 62-i) is released from the operating state. Thus, the abnormal detection signal produced from the sensor will lead to generation of the corresponding alarm speech without fail. Although the switch 81 can be manually operated, it is preferred to interlock the switch 8 with an ignition switch of a motor vehicle, for example, so that upon driving the motor vehicle the resetting operation described above is automatically performed. In the case of the embodiment shown in FIG. 8, the switches 79 and 81, the switches 62-1 to 62-i, the AND gates 76-1 to 76-i and the latch circuits 78-1 to 78-i constitute the second logic circuit.

Figure 9:
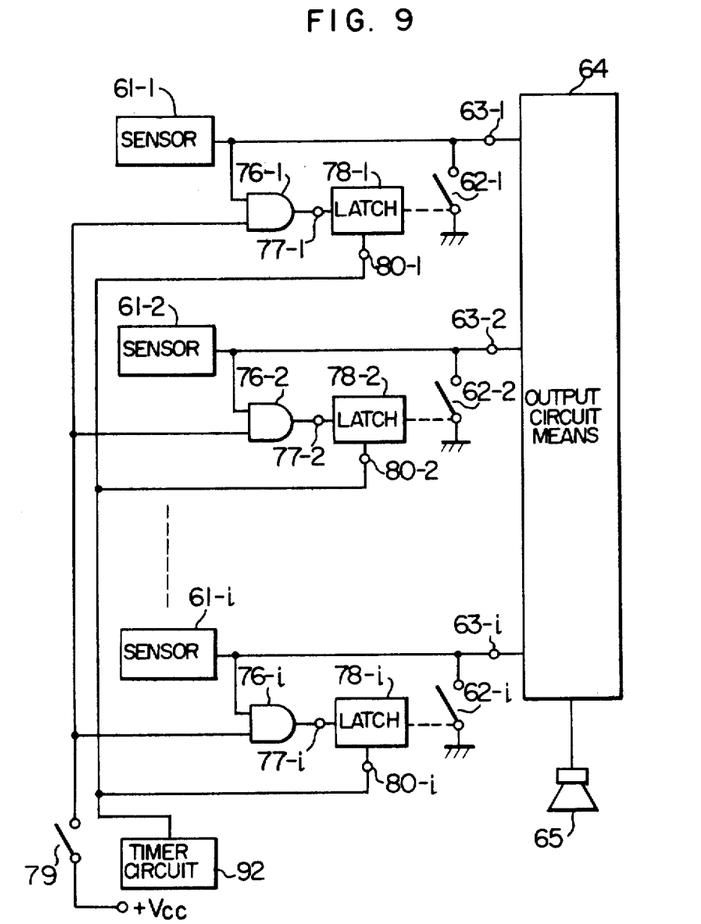

FIG. 9 shows a further exemplary embodiment of the invention, which differs from the one shown in FIG. 8 in that a timer circuit 92 is used in place of the switch 81 to automatically reset the latch circuit periodically at a predetermined time interval. Of course, arrangement may be made such that the operation or actuation of the switch 79 is controlled by the timer circuit 92 so that after an alarm speech has been repeatedly generated for a predetermined number of times, the generation of the alarm speech is automatically stopped. In the case of the embodiment illustrated in FIG. 9, the second logic circuit is constituted by the switches 62-1 to 62-i, the switch 79, the AND gates 76-1 to 76-i, the latch circuits 78-1 to 78-i and the timer circuit 92.

Figure 10:
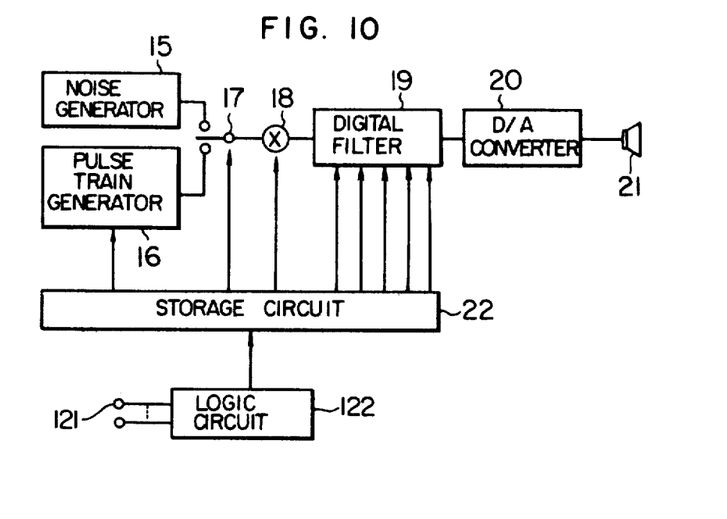
FIG. 10 shows in a block diagram of still another embodiment of the invention, where alarm speech producing means is illustrated in detail.

Finally, description will be made of the output circuit means 64 which may be employed in the alarm devices shown in FIGS. 6 to 9. FIG. 10 shows an example of the output circuit means 64. In this drawing, reference numeral 113 denotes a noise generator, 114 denotes a pulse train generator, 115 denotes a change-over switch for the vocal sound signal and the voiceless sound signal, 116 denotes a multiplier, 117 denotes a digital filter, 118 denotes a D/A converter, 120 denotes a storage circuit, 121 denotes an input terminal for receiving the sensor output, and 122 denotes a logic circuit. The arrangement and operations of the elements 113 to 120 are same as those of the corresponding components shown in FIG. 1. The logic circuit 122 includes the first logic circuit incorporating the priority circuit described hereinbefore in conjunction with FIGS. 1, 2 and 4 and/or the second logic circuit described with reference to FIGS. 6 to 9.

It will now be understood that in the alarm devices for a vehicle according to the embodiments shown in FIGS. 6 to 10, the alarm speech once generated in response to an abnormal state of the motor vehicle can be manually or automatically stopped. Thus, the abnormal states of various equipments of motor vehicles, for example, can be informed to the occupants with high certainty without giving discomfort to them.

We claim:

1. An alarm device for a vehicle, comprising:
 a plurality of sensors each for detecting a different abnormal state of the vehicle to produce an abnormal state detection signal;
 means for producing alarm speeches corresponding to said abnormal states of the vehicle detected by said sensors; and
 a logic circuit interposed between said plurality of sensors and said alarm speech producing means and responsive to a detection by any of said sensors to generate at least one alarm speech designation signal, said logic circuit including a priority circuit for receiving abnormal state detection signals produced by said sensors and determining the order of precedence of said received detection signals to generate said at least one alarm speech designation signal in accordance with said determined order of precedence for application to said alarm speech producing means, in which said priority circuit includes means for determining said order of precedence and means for temporarily disabling said received detection signals sequentially in said order of precedence so that plural alarm designation signals are generated sequentially in said order of precedence and such generation of alarm designation signals are automatically repeated.

2. An alarm device according to claim 1, in which said alarm speech producing means comprises a speech synthesis device including a memory array having a plurality of memory units storing alarm data and being arranged so as to be controlled by said priority circuit for providing their stored data responsive to said alarm speech designation signal, the alarm data in each of said memory units corresponding to a different one of said abnormal states of the vehicle.

3. An alarm device for a vehicle, comprising:
 a plurality of sensors each for detecting a different abnormal state of the vehicle to produce an abnormal state detection signal;
 means for producing alarm speeches corresponding to said abnormal states of the vehicle detected by said sensors; and
 a logic circuit interposed between said plurality of sensors and said alarm speech producing means and responsive to a detection by any of said sensors to generate at least one alarm speech designation signal, said logic circuit including a priority circuit for receiving abnormal state detection signals produced by said sensors and determining the order of precedence of said received detection signals to generate said at least one alarm speech designation signal in accordance with said determined order of precedence for application to said alarm speech producing means;

said alarm speech producing means including a memory array having a plurality of memory units storing alarm data and being arranged so as to be controlled by said priority circuit for providing their storing data responsive to said alarm speech designation signal, the alarm data in each of said memory units corresponding to different ones of said abnormal states of the vehicle, and a plurality of memory blocks each consisting of said memory units, said alarm data in the respective memory blocks being in different languages, and the device further comprises switch means connected with said memory array for enabling only one of said memory blocks.

4. An alarm device according to claim 1 or 3, in which the device further comprises another logic circuit interposed between said sensors and the first-mentioned logic circuit, said another logic circuit including means for preventing reception of at least one of said detection signals by the first-mentioned logic circuit.

5. An alarm device according to claim 4, in which said another logic circuit further includes means for recovering the reception of said at least one prevented detection signal by the first-mentioned logic circuit.

6. An alarm device according to claim 1 or 3, in which said logic circuit is constituted with a microcomputer.

* * * * *